US009977982B2

(12) United States Patent
Costa

(10) Patent No.: US 9,977,982 B2
(45) Date of Patent: May 22, 2018

(54) MEDICAL IMAGE PROCESSING METHOD AND IMAGE PROCESSING SYSTEM

(71) Applicant: SIEMENS HEALTHCARE GMBH, Erlangen (DE)

(72) Inventor: Maria Jimena Costa, Nuremberg (DE)

(73) Assignee: SIEMENS HEALTHCARE GMBH (DE)

( * ) Notice: Subject to any disclaimer, the term of this patent is extended or adjusted under 35 U.S.C. 154(b) by 16 days.

(21) Appl. No.: 15/186,572

(22) Filed: Jun. 20, 2016

(65) Prior Publication Data
US 2016/0379362 A1 Dec. 29, 2016

(30) Foreign Application Priority Data
Jun. 24, 2015 (DE) .......... 10 2015 211 714

(51) Int. Cl.
*G06K 9/00* (2006.01)
*G06K 9/46* (2006.01)
(Continued)

(52) U.S. Cl.
CPC .......... *G06K 9/46* (2013.01); *G06K 9/00362* (2013.01); *G06T 7/30* (2017.01); *G06K 2209/05* (2013.01); *G06T 2207/30004* (2013.01)

(58) Field of Classification Search
USPC ....... 382/100, 103, 128, 134, 155, 162, 168, 382/173, 181, 199, 209, 219, 232, 254,
(Continued)

(56) References Cited

U.S. PATENT DOCUMENTS 5,905,814 A * 5/1999 Mochizuki .............. G06T 9/005
382/238
8,837,791 B2 * 9/2014 Plakas ................... G06T 7/0038
378/1
(Continued)

FOREIGN PATENT DOCUMENTS

EP 1322224 B1 11/2008
JP 2012130667 A 7/2012

OTHER PUBLICATIONS

Search strategies for multiple landmark detection by submodular maximization; Liu et al., IEEE Conf. on Computer vision and Pattern Recognition (CVPR), 2010.
(Continued)

*Primary Examiner* — Seyed Azarian
(74) *Attorney, Agent, or Firm* — Schmeiser Olsen & Watts LLP

(57) ABSTRACT

A patient image record and a reference image record are read for capturing anatomical features of a patient on the basis of medical image records is provided. Joints are localized in the patient image record and in the reference image record by means of a pattern recognition method. At the localized joints, the patient image record is segmented into patient image segments and the reference image record is segmented into reference image segments. According to the invention, a segment-individual image deformation is established for a respective reference image segment or patient image segment, by means of which image deformation image structures of the reference image segment are mapped to corresponding image structures of the patient image segment). Then, an anatomical feature is captured on the basis of the segment-individual maps between the reference image segments) and the patient image segments.

13 Claims, 2 Drawing Sheets

Figure 1:
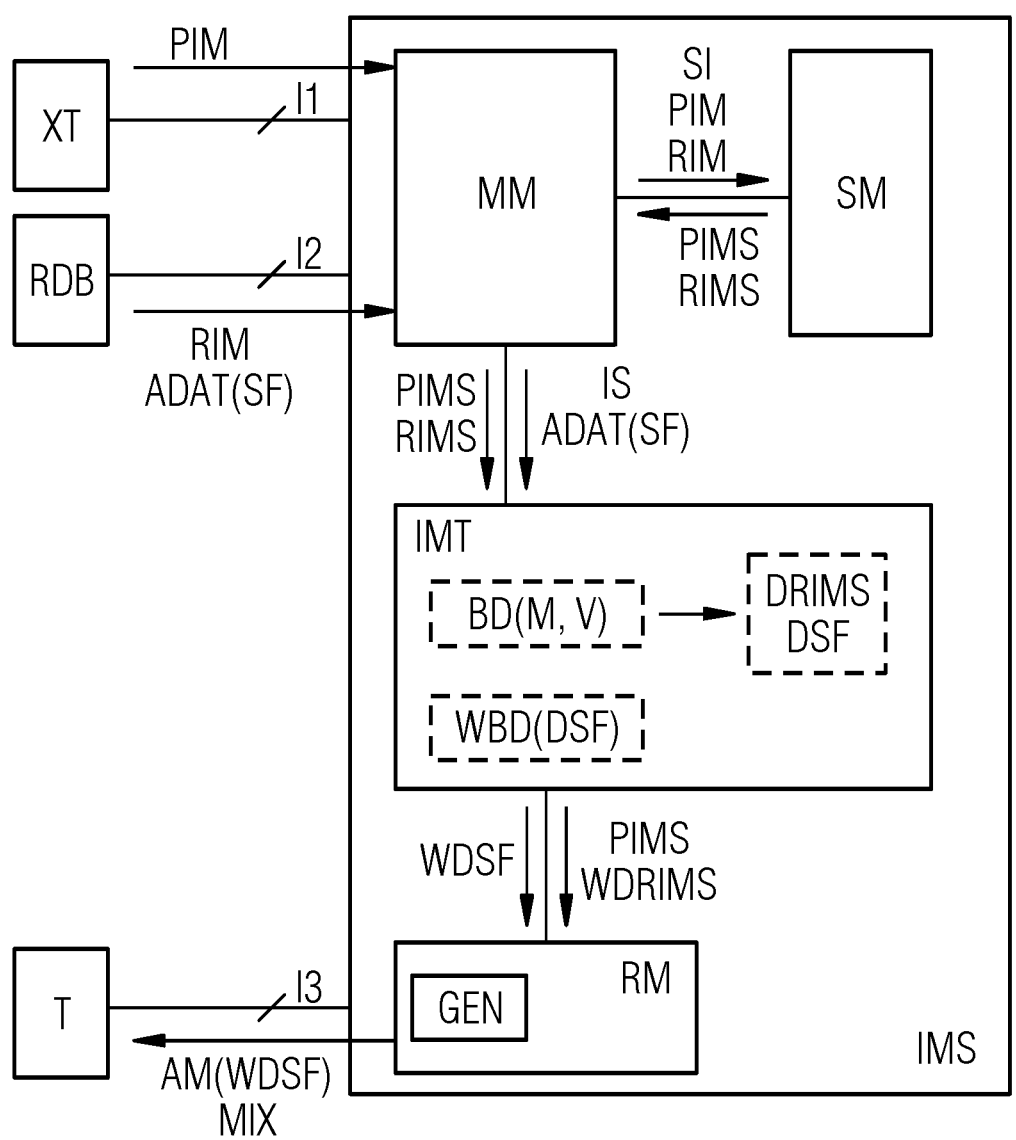

(51) Int. Cl.
*G06T 7/30* (2017.01)
*A61B 6/00* (2006.01)

(58) Field of Classification Search
USPC ....... 382/274, 276, 287–295, 305, 312, 238, 382/171; 378/1, 4, 21
See application file for complete search history.

(56) References Cited

U.S. PATENT DOCUMENTS

| | | | |
|---|---|---|---|
| 2011/0116698 A1* | 5/2011 | Weis | G06K 9/6207 382/131 |
| 2011/0235887 A1* | 9/2011 | Bertsch | A61B 5/055 382/132 |
| 2012/0163687 A1* | 6/2012 | Plakas | G06T 7/0038 382/131 |

OTHER PUBLICATIONS

Geometry-Aware Multiscale Image Registration via OBBTree-Based Polyaffine Log-Demons von C. Seiler, X. Pennec und M. Reyes in MICCAI'2011, vol. 6892 of LNCS, Springer, 2011, pp. 631 to 638.

* cited by examiner

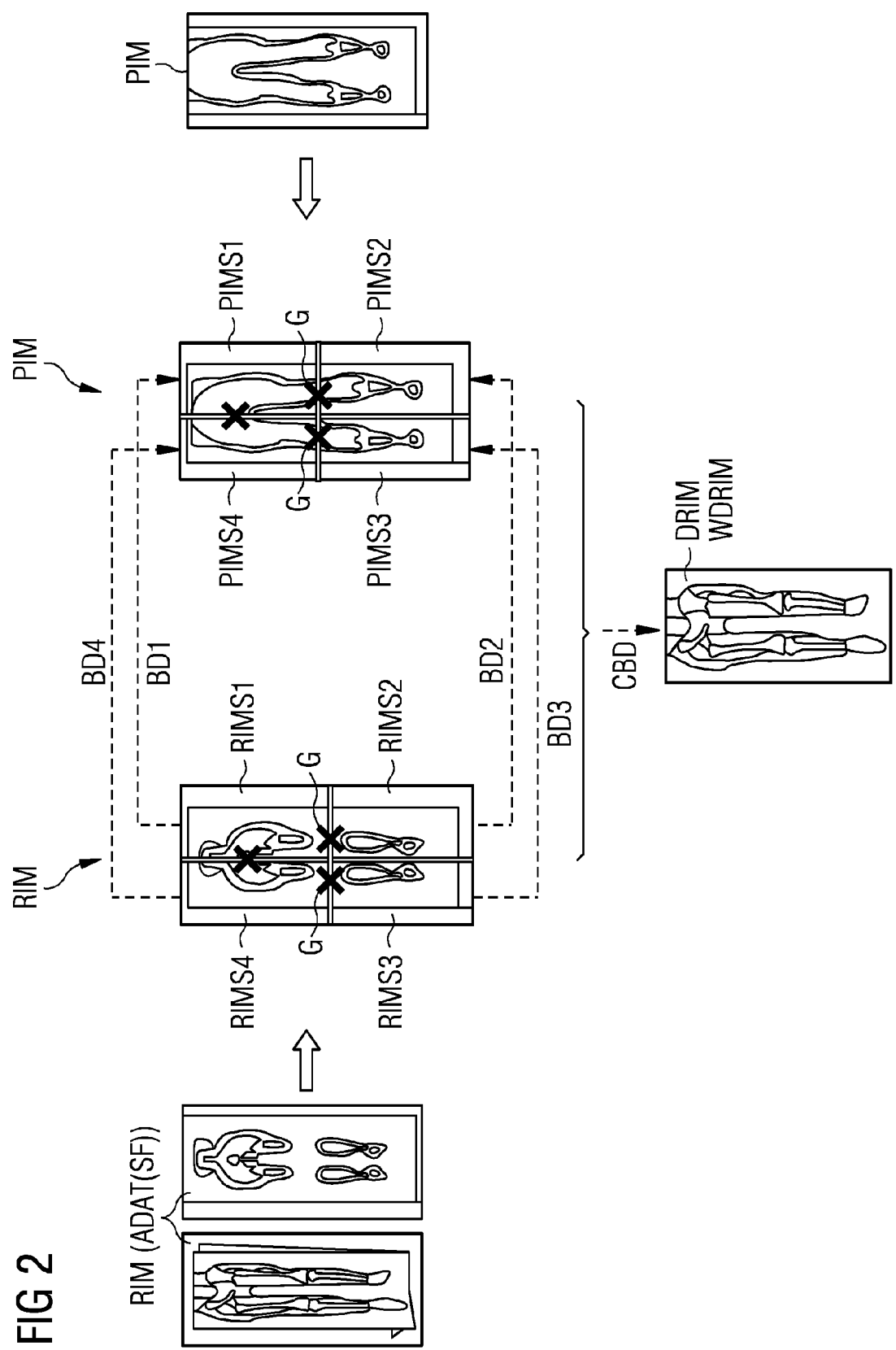

MEDICAL IMAGE PROCESSING METHOD AND IMAGE PROCESSING SYSTEM

CROSS-REFERENCE TO RELATED APPLICATIONS

This application claims priority to DE Application No. 102015211714.6, having a filing date of Jun. 24, 2015, the entire contents of which are hereby incorporated by reference.

FIELD OF TECHNOLOGY

The following relates to a medical image processing method and image processing system for capturing anatomical features of a patient on the basis of medical image records.

BACKGROUND

Modern medical diagnostics rely to a significant extent on medical imaging which, for example, is based on radiological, angiographic, sonographic and/or tomographic image records. Here, attempts are increasingly made to automatically identify and capture anatomical features in medical image records by the use of image analysis methods. Such a capture of anatomical features is often also referred to as registration.

The automatic capture of anatomical features in medical image records is generally made more difficult by virtue of a patient or a body part generally not assuming exactly the same position in various image records and elastic tissue elastically deforming to a different extent in the records, depending on the position of the patient. This applies, in particular, when comparing patient image records with reference image records, which often originate from different patients.

In this context, the publication "Geometry-Aware Multiscale Image Registration via OBBTree-Based Polyaffine Log-Demons" by C. Seiler, X. Pennec and M. Reyes in MICCAI'2011, Vol. 6892 of LNCS, Springer, 2011, pages 631 to 638, has disclosed the practice of deforming an image record depending on tissue stiffness in order to compensate for elastic deformations. However, this process requires specification on the part of the user to the extent of which tissue structures are substantially rigid and which are flexible.

SUMMARY

An aspect relates to a medical image processing method and image processing system, by means of which anatomical features can be automatically captured in medical image records in an improved manner.

According to embodiments of the invention, a patient image record and a reference image record are read for capturing anatomical features of a patient on the basis of medical image records. In this context, anatomical features can be e.g. tissue features, tissue structures, tissue types, tissue properties, a tissue condition or other phenotypical features and their pathological changes or changes due to injury. Joints are localized in the patient image record and in the reference image record by means of a pattern recognition method. At the localized joints, the patient image record is segmented into patient image segments and the reference image record is segmented into reference image segments. According to embodiments of the invention, a segment-individual image deformation is established for a respective reference image segment or patient image segment, by means of which image deformation image structures of the reference image segment are mapped to corresponding image structures of the patient image segment. Then, an anatomical feature is captured on the basis of the segment-individual maps between the reference image segments and the patient image segments.

A substantial advantage of embodiments of the invention should be considered that of medical image records being able to be superposed more exactly on reference image records due to the segment-individual image deformation, as a result of which anatomical features can be identified and captured more reliably and more accurately. Furthermore, the capture according to embodiments of the invention is robust in relation to differences in the positioning of patients in patient image records. Such positioning differences may be e.g. varying angles of limbs, differences in size, asymmetries or pathological deformations or deformations due to injury. Moreover, an automatic segmentation of patient image records can be significantly improved by the capture according to embodiments of the invention.

Advantageous embodiments and developments of the invention are specified in the dependent claims.

According to an advantageous embodiment of the invention, the image structures to be mapped onto one another can comprise the localized joints. To the extent that the positioning differences of body parts in medical image records can be represented, in particular, by the position of the joints, such positioning differences can be identified and compensated for in a simple manner by mapping the joints localized in the reference image segments onto the joints localized in the patient image segments.

Preferably, the segment-individual image deformation can comprise an affine image transformation, i.e. a substantially linear map with an offset. The affine image transformation can be parameterized by a mapping matrix and an offset vector. In this way, a multiplicity of positioning differences in the patient image record already can be compensated for effectively by varying a comparatively small number of deformation parameters.

According to an advantageous embodiment of the invention, image structures of the reference image record can be associated with anatomical feature data. Then, the anatomical feature data can be associated with those image structures of the patient image record onto which the image structures of the reference image record are mapped. By way of example, the anatomical feature data can be specifications, by means of which known anatomical features of the reference image record were annotated. In this way, annotations of the reference image data can be associated directly with the corresponding image structures of the patient image record and can be captured as anatomical feature of these image structures.

In particular, the anatomical feature data can comprise a spatially resolved feature field. Then, the feature field can be deformed in a segment-individual manner by the image deformation established in each case and the deformed feature field can be mapped in a spatially resolved manner onto the patient image record. Here, in particular, the feature field can comprise a stiffness field, which specifies tissue stiffness in a spatially resolved manner. In this way, a stiffness field can be established for the patient image record, said stiffness field specifying the tissue stiffness of the tissue imaged in the patient image record with a spatially resolved assignment.

According to an advantageous development of the invention, a further image deformation taking into account the spatially resolved tissue stiffness can be established in a manner dependent on the stiffness field. In general, the segment-individual image deformation can be significantly refined by the further image deformation. Thus, tissue regions which are relatively rigid in accordance with the stiffness field (e.g. bones) can be deformed to a lesser extent in the further image deformation than softer or more flexible tissue regions (e.g. muscles).

Moreover, deformed image structures from the deformed reference image segments can be combined with patient image segments and a resultant mixed image can be output. Here, the deformed image structures and the deformed reference image segments can be deformed by the segment-individual image deformations and/or by the further image deformation.

Furthermore, the patient image segments and/or the reference image segments can be captured and/or registered.

Furthermore, the segment-individual image deformations and the reference image segments can be used for specific regions of the patient image record to establish the extent to which said regions are deformed within the scope of a further image deformation.

BRIEF DESCRIPTION

Some of the embodiments will be described in detail, with reference to the following figures, wherein like designations denote like members, wherein:

FIG. 1 shows a medical image processing system according to embodiments of the invention; and FIG. 2 shows a visualization of work steps of a medical image processing method according to embodiments of the invention.

DETAILED DESCRIPTION

FIG. 1 schematically depicts a medical image processing system IMS for identifying, extracting and capturing anatomical features AM of a patient on the basis of medical image records. By way of example, the anatomical features AM to be captured can be tissue features, tissue structures, tissue types, tissue properties, a tissue condition or other phenotypical features and their pathological changes or changes due to injury. Here, tissue types can be e.g. bone tissue, muscle tissue or connective tissue. In particular, tissue stiffness can be captured as a tissue property. By way of example, tissue structures can be organs or organ regions, i.e. areas taken up by an organ or a specific part thereof.

A medical image recording device XT is coupled to the image processing system IMS by way of a first interface I1. The image recording device XT can be e.g. an x-ray tomography scanner, a magnetic resonance imaging scanner or an ultrasound device or any other recording device, which supplies image records of a body structure. Furthermore, a reference database RDB with a multiplicity of stored reference image records of patients is coupled to the image processing system IMS by way of a second interface I2. The second interface I2 can also be identical to the first interface I1.

The image recording device XT is used to record a medical patient image record PIM of the patient and said medical patient image record is transmitted to a pattern recognition module MM of the image processing system IMS by way of the first interface I1. Furthermore, the image processing system IMS queries one or more medical reference image records RIM from the database RDB and transmits said reference image records to the pattern recognition module MM by way of the second interface I2. The image records PIM and RIM are preferably spatially resolved images which are transmitted in the form of digital image data.

Together with a reference image record RIM, anatomical feature data ADAT are transmitted to the pattern recognition module MM from the database RDB. The anatomical feature data ADAT are feature data known in advance, which are associated with known image structures in the reference image record RIM and describe the latter. Here, image structures may be e.g. joints, bones, organs and/or other tissue structures. The anatomical feature data ADAT can be realized as annotations of the image structures, for example as a specification that a relevant image structure is a specific joint, a specific organ and/or a specific tissue type. To this end, manually or automatically annotated mesh models can be used for bones, organs, muscles and/or skin. In the present exemplary embodiment, the anatomical feature data ADAT comprise, in particular, a stiffness field SF, which specifies a known or otherwise established tissue stiffness of tissue structures in the reference image record RIM in a spatially resolved manner. In particular, the stiffness field SF can be provided as a spatially resolved feature field, which specifies the tissue stiffness as a function of one, two or three spatial coordinates.

The pattern recognition module MM serves to identify and localize image structures, in particular joints and other tissue structures, in the transmitted image records PIM and RIM. According to embodiments of the invention, the pattern recognition module MM identifies and localizes the imaged joints in both the patient image record PIM and in the reference image record RIM. The determined positions of the joints in the image records PIM and RIM are subsequently transmitted as segmentation information SI from the pattern recognition module MM to a segmentation module SM, together with the image records PIM and RIM.

The segmentation module SM is coupled to the pattern recognition module MM and it serves to segment the image records PIM and RIM into specific image segments. In the present exemplary embodiment, the segmentation information SI specifies where a respective image record PIM or RIM is to be subdivided, i.e. segmented, into individual segments, namely at the localized joints. In this way, the segmentation module SM generates patient image segments PIMS by dividing the patient image record PIM at the joints localized therein and reference image segments RIMS by dividing the reference image record RIM at the joints localized therein. In so doing, a respective patient image segment PIMS of a respective body segment is associated with a reference image segment RIMS of this body segment.

The patient image segments PIMS and reference image segments RIMS are transmitted from the segmentation module SM to the pattern recognition module MM. A respectively transmitted patient image segment PIMS and a respectively associated reference image segment RIMS are analyzed by the pattern recognition module MM, with specific image structures being identified and localized. The image structures to be identified in this case comprise, in particular, joints imaged in the image segments.

In particular, the pattern recognition module MM identifies which image structures of a respective patient image segment PIMS correspond to which image structures of the associated reference image segment RIMS, i.e. relate to the same body structure. Image structures corresponding in such a way are then associated with one another.

Structure information IS which comprises specifications about the image structures identified in the image segments PIMS and RIMS and, in particular, the positions thereof is formed by the pattern recognition module MM as a result of the image structure recognition. In particular, the structure information IS comprises a respective position of the identified joints. The structure information IS describing the reference image segments RIMS contains, in particular, the anatomical feature data ADAT, which are associated with the image structures identified in the reference image segments RIMS.

Together with the anatomical feature data ADAT, which comprise the stiffness field SF, and together with the patient image segments PIMS and the reference image segments RIMS, the structure information IS is transmitted to an image transformation module IMT of the image processing system IMS.

The image transformation module IMT is coupled to the pattern recognition module MM and it serves to establish a segment-individual image deformation BD for a respective reference image segment RIMS and/or patient image segment PIMS. The segment-individual image deformation BD is established in such a way that identified image structures of a reference image segment RIMS are mapped as exactly as possible onto identified image structures of the associated patient image segment PIMS by the segment-individual image deformation BD. In particular, joints, bones, organs, tissue interfaces and/or tissue boundaries are mapped to one another.

The segment-individual image deformation BD is established on the basis of the structure information IS as an image transformation or image distortion, preferably as an affine image transformation. Here, an affine image transformation denotes a linear map with an offset. Such an affine image transformation can be parameterized by a mapping matrix M and an offset sector V.

As already mentioned above, the segment-individual image deformation BD is established in such a way that the identified image structures of a respective reference image segment RIMS are largely made to be superposed on the corresponding image structures of an associated patient image segment PIMS. By way of example, this can be brought about by virtue of parameters of the image deformation BD being varied in such a way that deviation squares between corresponding image structures are minimized. To this end, the mapping matrix M and the offset vector V in affine image transformations can be varied in a segment-individual manner by means of the image transformation module IMT.

In the present exemplary embodiment, a respective reference image segment RIMS is deformed by the image deformation BD established specifically for this reference image segment RIMS in order thus to obtain a deformed reference image segment DRIMS. As a result of the image deformations BD determined in a segment-individual manner, the deformed image structures of the deformed reference image segments DRIMS can be largely made to be superposed on the corresponding image structures of the associated patient image segment PIMS and thus can be mapped onto these image structures.

As already mentioned above, anatomical feature data ADAT are associated with a respective image structure of the reference image segments RIMS or the deformed reference image segments DRIMS. Within the scope of mapping the image structures of the reference image segments RIMS or the deformed reference image segments DRIMS onto corresponding image structures of the patient image segments PIMS, the respectively associated anatomical feature data are associated with those image structures of the patient image segments PIMS on which the corresponding image structures of the reference image segments RIMS or DRIMS are mapped. In the present exemplary embodiment, the anatomical feature data ADAT comprise the spatially resolved stiffness field SF. The latter is deformed together with a respective reference image segment RIMS in a segment-individual manner by the respective segment-individual image deformation BD in order to obtain a deformed stiffness field DSF. Then, like the deformed reference image segments DRIMS, the deformed stiffness field DSF is mapped onto the patient image segments PIMS in a spatially resolved manner. Hence, the deformed stiffness field DSF specifies a tissue stiffness of the tissue imaged in the patient image record PIM with a good spatial assignment.

Depending on the segment-individual deformed stiffness field DSF, a further segment-individual image deformation WBD is established by the image transformation module IMT in the present exemplary embodiment. When establishing the further image deformation WBD, the spatially resolved tissue stiffness is taken into account to the extent that tissue regions which are stiffer in accordance with the deformed stiffness field DSF are deformed less than tissue regions which are softer or more flexible in accordance with the deformed stiffness field DSF. Thus, the further image deformation WBD can substantially not deform the image region of a bone, while the surrounding muscle is deformed more strongly. Thus, the further segment-individual image deformation WBD can be considered to be a refinement of the segment-individual image deformation BD. In this way, the anatomical feature data ADAT and, in particular, the stiffness field SF can be associated in a spatially more accurate manner with the image structures of the patient image record.

The further image deformation WBD is applied in a segment-individual manner to the deformed reference image segments DRIMS in order to obtain reference image segments WDRIMS which are deformed in a refined manner. In parallel therewith, the further image deformation WBD is applied to the deformed stiffness field DSF in order thus to obtain a stiffness field WDSF deformed in a refined manner. Together with the patient image segments PIMS and the stiffness field WDSF deformed in a refined manner, the reference image segments WDRIMS deformed in a refined manner are transmitted from the image transformation module IMT to a capture module RM.

The capture module RM is coupled to the image transformation module IMT and it serves to capture and/or register an anatomical feature AM, a patient image segment PIMS and/or a reference image segment RIMS on the basis of the segment-individual maps between the reference image segments RIMS and the patient image segments PIMS. As already described above, the map between image structures of the reference image record RIM and image structures of the patient image record PIM, which map is optionally deforming in a refined manner, allows a comparatively exact spatial association of the anatomical feature data ADAT and, in particular, of the stiffness field SF with image structures in the patient record PIM. In this way, these image structures of the patient image record PIM can be identified, captured and registered specifically as anatomical features AM of the patient. In particular, this renders it possible to capture bones, muscles, organs or organ regions, as well as tissue stiffness, as anatomical features AM.

The capture module RM comprises an image generator GEN for generating a mixed image MIX by combining the patient image record PIM with segment-individually deformed image structures of the reference image segments RIMS and/or with segment-individually deformed stiffness fields DSF or WDSF of the reference image segments RIMS.

A terminal T is coupled to the image processing system IMS via a third interface I3 for the purposes of outputting the mixed image MIX and the captured anatomical features AM. In the present exemplary embodiment, the stiffness field WDSF deformed in a refined manner is also output to the terminal T by the capture module RM, together with the other captured anatomical features AM and the mixed image MIX. The mixed image MIX and the anatomical feature data AM with the stiffness field WDSF deformed in a refined manner can, in particular, also be output for external post-processing of the patient image record PIM.

FIG. 2 elucidates work steps of the medical image processing method according to embodiments of the invention in a schematic illustration. The image processing method according to embodiments of the invention is applied to a segmentation of legs in image records obtained by means of magnetic resonance imaging. The image records comprise a patient image record PIM depicted on the right-hand side of FIG. 2 and a reference image record RIM depicted on the left-hand side of FIG. 2. In each case, the image records PIM and RIM are spatially resolved magnetic resonance imaging records, wherein, in particular, the reference image record RIM comprises a plurality of slices and differentiates between different tissue types. In the present exemplary embodiment, the left-hand image part of the reference image record RIM depicted in FIG. 2 represents, in particular, bone structures.

Tissue structures and, in particular, bone structures should be captured as anatomical features for the patient image record PIM by way of the image processing method according to embodiments of the invention. It is assumed that the tissue structures to be extracted from the patient image record PIM are already known for the reference image record RIM and are described by the anatomical feature data ADAT. By way of example, the anatomical feature data ADAT can be provided by manually or automatically annotated mesh models of bone tissue, muscle tissue and skin tissue. As already noted above, the anatomical feature data ADAT also comprise the spatially resolved stiffness field SF.

As elucidated in the central part of FIG. 2, joints G, in this case the knee joints, are respectively detected and localized in the patient image record PIM and in the reference image record RIM. Moreover, a connecting point between the legs is identified and localized in both image records PIM and RIM. In FIG. 2, the localized joints G and the connection points are marked by crosses in each case. Such a detection and localization can be carried out automatically by means of heuristic rules or by means of so-called trained landmark detectors. By way of example, such a landmark detector is known from the article "Search Strategies for Multiple Landmark Detection by Submodular Maximization" by David Liu, S. Zhou, D. Bernhardt and D. Comaniciu in IEEE Conference on Computer Vision and Pattern Recognition (CVPR), 2010.

The patient image record PIM and the reference image record RIM are subsequently respectively segmented into image segments at the localized joints G and connecting points, i.e. segmented into leg segments in this case. Here, the patient image record PIM is subdivided into the patient image segments PIMS1, . . . , PIMS4 and the reference image record RIM is subdivided into the reference image segments RIMS1, . . . , RIMS4. As a result, the patient image segments PIMS1, . . . , PIMS4 and the reference image segments RIMS1, . . . , RIMS4 are initially captured and registered. Thereupon, a segment-individual, preferably affine image deformation BD1, BD2, BD3 and BD4 is calculated for each one of the reference image segments RIMS1, . . . , RIMS4 in such a way that the corresponding reference image segment RIMS1, . . . or RIMS4 can be brought to be superposed to the largest possible extent with the corresponding patient image segment PIMS1, . . . or PIMS4. Consequently, four individual image transformations BD1, . . . , BD4 are calculated in the present exemplary embodiment. The maps of the reference image segments RIMS1, . . . , RIMS4 onto the patient image segments PIMS1, . . . , PIMS4 by the image deformations BD1, . . . , BD4 are denoted by dotted arrows in FIG. 2.

The mutually independent image deformations BD1, . . . , BD4 can, in particular, compensate different positioning of the legs in the patient image record PIM and in the reference image record RIM. Preferably, the individual image deformations BD1, . . . , BD4 can be combined, preferably in a linear manner, to a combined image deformation CBD. The combined, preferably polyaffine image deformation CBD can then be applied to the reference image record RIM as a whole and, in particular, to the tissue structures imaged there. In the present exemplary embodiment, the combined image deformation CBD is applied, in particular, to the rigid tissue structures imaged in the reference image record RIM, i.e. to the bone structures.

The application of the combined image deformation CBD to the reference image record RIM and the tissue structures thereof supplies a deformed reference image record DRIM, in which, in particular, the bone structure of the reference image record RIM is brought to be superposed on, or fitted to, tissue structures imaged in the patient image record PIM. Additionally, the combined image deformation CBD can also comprise the further image deformation WBD described in conjunction with FIG. 1 in order thus to generate a reference image record WDRIM which is deformed in a refined manner.

The deformed tissue structures of the reference image record RIM, which can be fit into the patient image record PIM after the deformation, can also be used to deform the previously known stiffness field SF of the reference image record RIM in order thus to generate an individually personalized stiffness field for rigid tissue structures, e.g. bone structures, and other, more flexible tissue structures.

The image processing method according to the invention renders it possible to take into account and compensate both position-dependent variations (in particular caused by the position of joints) and deformation-dependent variations (in particular caused by the deformation of soft tissue) in medical image records when capturing anatomical features. Moreover, it is also possible to compensate, in a segment-individual manner, anatomical differences between different persons, asymmetries or pathological deformations.

The claims are as follows:

1. A medical image processing method for capturing anatomical features of a patient on a basis of medical image records, comprising:
   a) receiving, by an image processing system, a patient image record, from a medical image recording device, coupled to the image processing system;
   b) reading obtaining, by the image processing system, a reference image record from a reference database coupled to the image processing system;

c) localizing, by the image processing system, joints within the patient image record and within the reference image record, using a pattern recognition method;

d) at the localized joints, segmenting, by the image processing system, the patient image record into patient image segments and segmenting the reference image record into reference image segments;

e) establishing, by the image processing system, a segment-individual image deformation for a respective reference image segment or patient image segment, by means of which image deformation image structures of the reference image segment are mapped to corresponding image structures of the patient image segment; and f) capturing, by the image processing system, an anatomical feature on a basis of the segment-individual maps between the reference image segments and the patient image segments;

wherein the image processing system uses a processor associated with at least one of: radiological, angiographic, sonographic, and tomographic image processing device.

2. The medical image processing method as claimed in claim 1, wherein the image structures to be mapped on to one another comprise the localized joints.

3. The medical image processing method as claimed in claim 1, wherein the segment-individual image deformation comprises an affine image transformation.

4. The medical image processing method as claimed in claim 1, wherein image structures of the reference image record are associated with anatomical feature data and the anatomical feature data are associated with those image structures of the patient image record onto which the image structures of the reference image record are mapped.

5. The medical image processing method as claimed in claim 4, wherein the anatomical feature data comprise a spatially resolved feature field, the spatially resolved feature field is deformed in a segment-individual manner by the segment-individual image deformation established in each case, and the deformed spatially resolved feature field is mapped in a spatially resolved manner onto the patient image record.

6. The medical image processing method as claimed in claim 5, wherein the spatially resolved feature field comprises a stiffness field, which specifies tissue stiffness in a spatially resolved manner.

7. The medical image processing method as claimed in claim 6, wherein a further image deformation taking into account the spatially resolved tissue stiffness is established in a manner dependent on the stiffness field.

8. The medical image processing method as claimed in claim 1, wherein deformed image structures from the deformed reference image segments are combined with patient image segments and a resultant mixed image is output.

9. The medical image processing method as claimed in claim 1, wherein the patient image segments and/or the reference image segments are captured and/or registered.

10. The medical image processing method as claimed in claim 1, wherein the segment-individual image deformations and the reference image segments are used for specific regions of the patient image record to establish the extent to which said regions are deformed within the scope of a further image deformation.

11. A medical image processing system for capturing anatomical features of a patient on a basis of medical image records, comprising:

a) a first interface for reading a patient image record, the first interface coupling a medical image recording device to the medical image processing system;

b) a second interface for reading a reference image record, the second interface coupling a reference database to the medical image processing system;

c) a pattern recognition module for localizing joints in the patient image record and in the reference image record;

d) a segmentation module for segmenting the patient image record into patient image segments and for segmenting the reference image record into reference image segments, in each case at the localized joints;

e) an image transformation module for establishing a segment-individual image deformation for a respective reference image segment or patient image segment, wherein the segment-individual image deformation maps image structures of the reference image segment onto corresponding image structures of the patient image segment, and f) a capture module for capturing an anatomical feature on a basis of the segment-individual maps between the reference image segments and the patient image segments;

wherein the image processing system uses a processor associated with at least one of: radiological, angiographic, sonographic, and/or tomographic image processing device.

12. A non-transitory computer program product, configured to execute a medical image processing method as claimed in claim 1 or to implement a medical image processing system.

13. A non-transitory computer-readable storage medium, comprising a stored computer program product as claimed in claim 12.

* * * * *